Dec. 20, 1932.  W. D. JORDAN ET AL  1,891,714
REFRIGERATING SYSTEM
Filed April 16, 1932   4 Sheets-Sheet 2
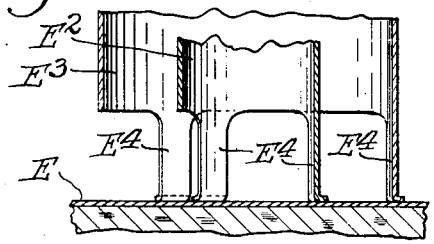
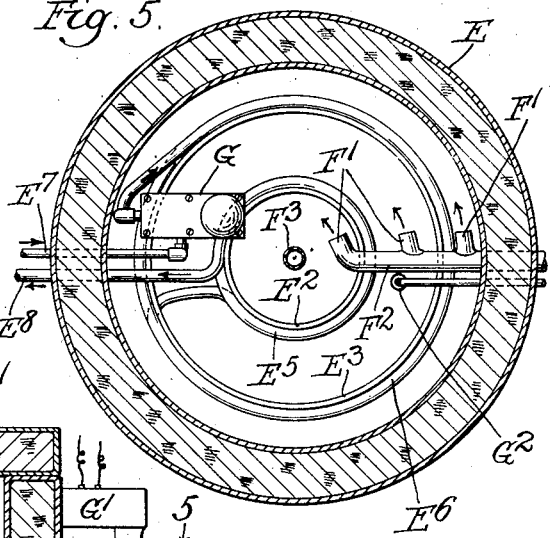
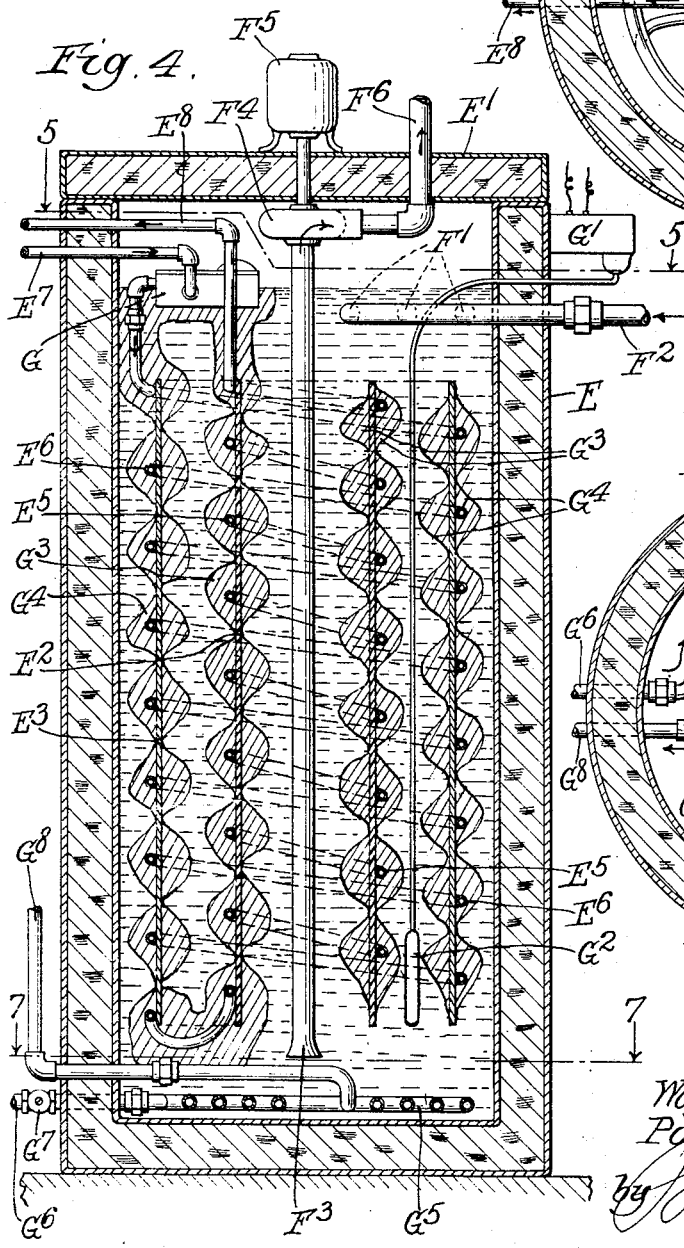
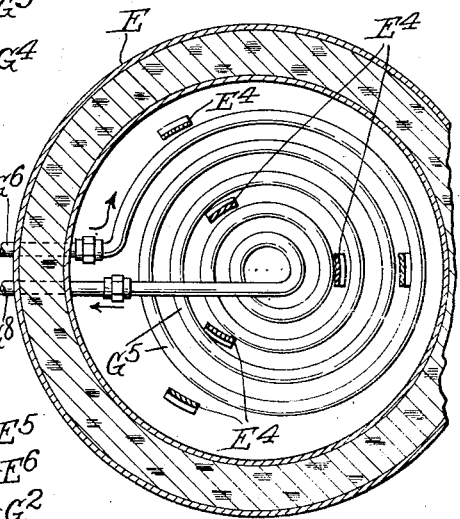
Inventors.
Wayne D. Jordan
Paul D. Van Vliet
by Archer & Carter
Attorneys.

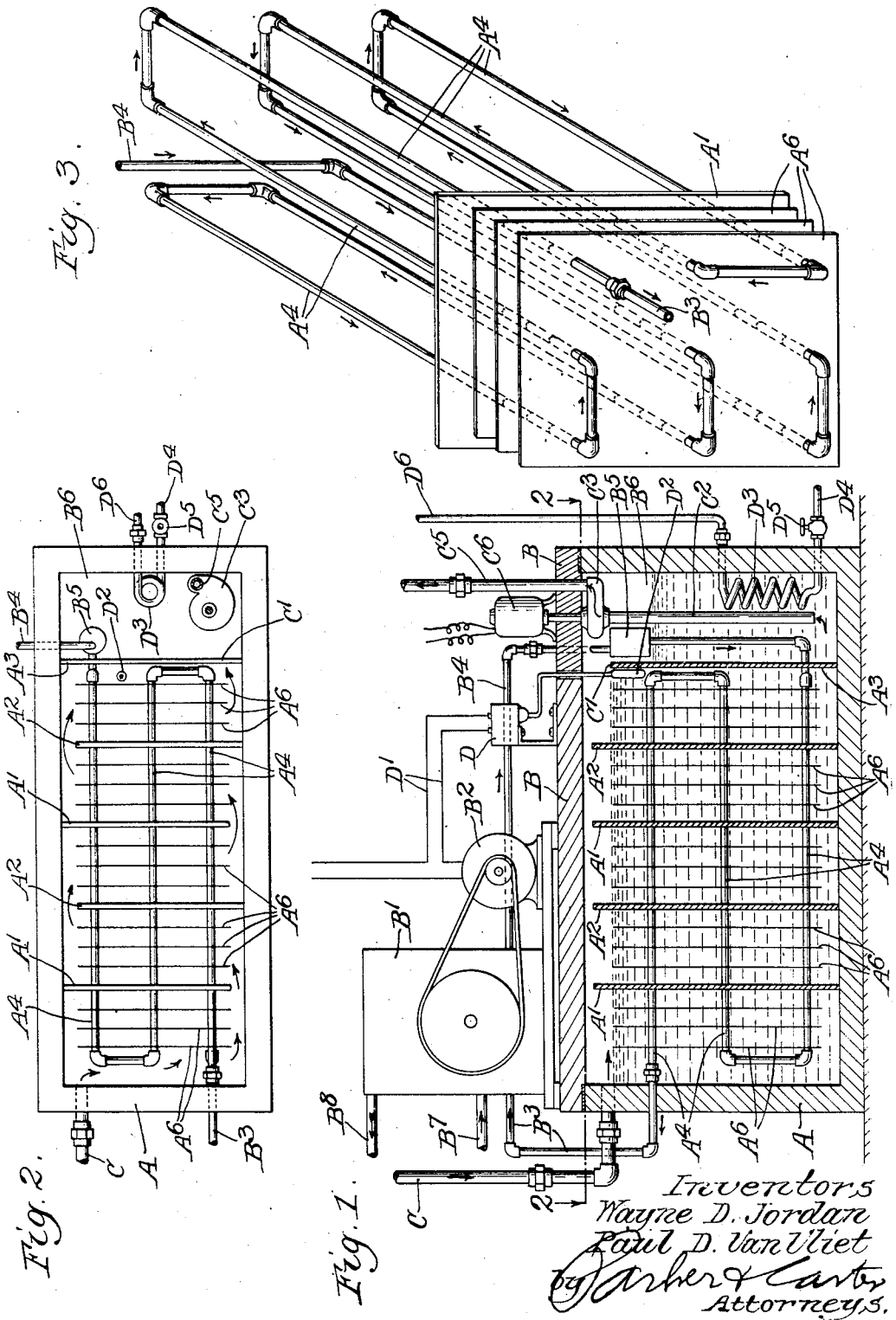
Dec. 20, 1932.  W. D. JORDAN ET AL  1,891,714
REFRIGERATING SYSTEM
Filed April 16, 1932  4 Sheets-Sheet 1
Inventors
Wayne D. Jordan
Paul D. VanVliet
by Arber & Carter
Attorneys.

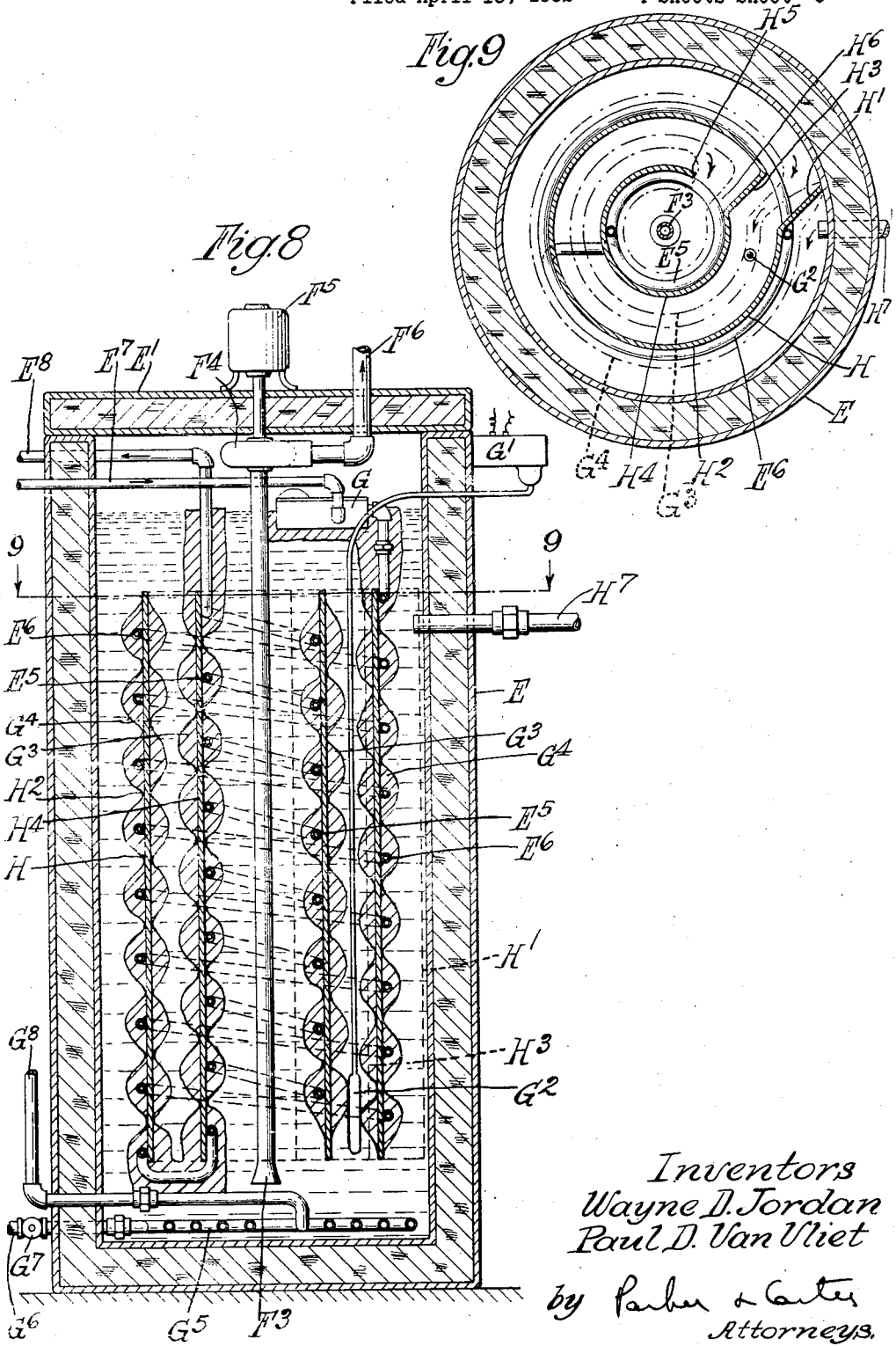

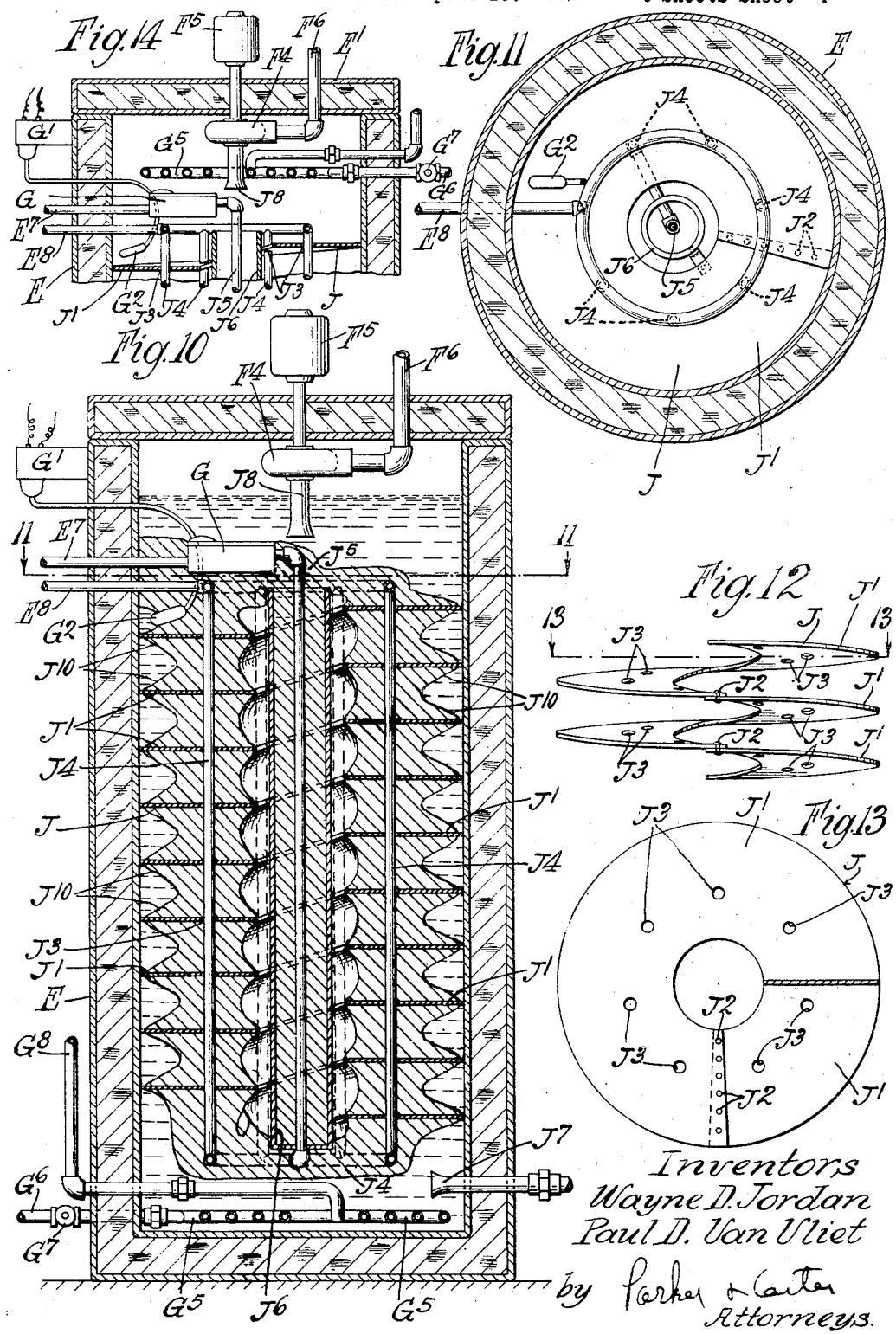

Patented Dec. 20, 1932

1,891,714

UNITED STATES PATENT OFFICE

WAYNE D. JORDAN AND PAUL D. VAN VLIET, OF CHICAGO, ILLINOIS, ASSIGNORS TO AIR CONTROL SYSTEMS INC., OF CHICAGO, ILLINOIS, A CORPORATION OF DELAWARE

REFRIGERATING SYSTEM

Application filed April 16, 1932. Serial No. 605,594.

Our invention relates to refrigerating systems and has for one object to provide a refrigerating system wherein a refrigerant condensing unit is caused to operate substantially continuously, part of the time serving to supply cooled or refrigerated liquid to any suitable form of heat transfer apparatus and part of the time to freeze such liquid when the heat exchange device is inactive so that during the time when the heat exchange device is in use, there will be available refrigerating capacity in excess of the maximum capacity of the condensing unit, which capacity is made up in part by the condensing unit itself and in part by melting the stored frozen liquid accumulated by the operation of the condensing unit while the heat exchange is inoperative.

Our apparatus is especially well adapted for use in connection with air conditioning systems for use in houses, stores and the like where it is necessary to cool the air during a part of the day only and is intended to make it possible to use with such an air conditioning device, a refrigerant condensing unit of less capacity than the maximum requirement of the system, the idea being that the condensing unit will run substantially continuously. When the air conditioning device shuts down at night, the circulating medium, which is preferably water, will no longer circulate or will, in any event, not be subjected to warming during such period with the result that it will be substantially frozen in a storage tank into a mass or an agglomeration of crystals. When the air conditioner starts up in the morning, owing to the fact that this tank is substantially filled with the frozen liquid, the unfrozen circulating medium will travel at relatively high velocity across the face of the frozen mass, thus melting the mass and exposing a greater and greater portion of the coils which carry the refrigerant so that the cooling load will be gradually transferred from the stored frozen liquid to the condensing unit until if the apparatus works at maximum capacity the frozen liquid will all be melted at the time that the conditioning device goes out of operation in the evening.

It will be understood, of course, that cooling effect may be stored in this manner, taking advantage of the fact that the freezing of water or other liquid is accompanied by the giving up of a greatly disproportionate number of heat units to what would result from the mere cooling of an equal volume of liquid within the usable temperature range.

Our invention is illustrated more or less diagrammatically in the accompanying drawings, wherein—

Figure 1 is a longitudinal section through the storage tank showing the condenser, pump and driving mechanism in side elevation;

Figure 2 is a section along the line 2—2 of Figure 1;

Figure 3 is a perspective lay out of the pipe coils in the storage tank;

Figure 4 is a vertical section through a modified form of storage tank;

Figure 5 is a section along the line 5—5 of Figure 4;

Figure 6 is a section with parts omitted along the line similar to section of Figure 4 through the bottom of the tank;

Figure 7 is a section along the line 7—7 of Figure 4;

Figure 8 is a vertical section through a variant form;

Figure 9 is a section on the line 9—9 of Figure 8;

Figure 10 is a section similar to Figure 8 through a further variant form;

Figure 11 is a section on the line 11—11 of Figure 10;

Figure 12 is a side elevation of a portion of the fin structure;

Figure 13 is a section on the line 13—13 of Figure 12; and

Figure 14 is a partial section similar to Figure 10, illustrating the cooling coil positioned differently.

Like parts are indicated by like symbols throughout the specification and drawings.

We refer first to the form of the structure shown in Figures 1 to 3.

A is an insulated storage tank. It contains a plurality of baffle plates $A^1$ $A^2$. These plates are preferably of heat conductive material, such as metal. All these plates extend clear down to the bottom as indicated and all of them terminate short of the top as indicated in Figure 1 and alternate plates are in contact with one or the other side of the tank and terminate short of the opposed side. At the end of the tank is an inner wall $A^3$ which extends clear across engaging the bottom and both sides but terminating short of the top. $A^4$ is a refrigerant expansion coil extending throughout substantially the entire area of the tank except that part beyond the wall $A^3$ where there is formed a control chamber $B^6$. The elements of the coil are in intimate contact with the baffle plates $A^1$ $A^2$ where they pass through them and between opposed pairs of baffle plates or between the baffle plates and the end of the tank removed from the plate $A^3$ are heat conducting vanes or fins $A^6$ which also are in intimate contact with the coil. The baffle plates $A^1$ $A^2$ are also in heat conducting relation with the coil.

B is a cover plate for the tank and on the cover plate is mounted a refrigerant condenser unit $B^1$ driven by any suitable motor $B^2$. The condenser is in communication with both ends of the coil $A^4$ by means of pipes $B^4$ $B^3$, the fluid refrigerant being supplied to the coil by the condenser unit in the direction shown by the arrow. $B^5$ is a float valve contained within the control chamber $B^6$ disposed between the baffle $A^3$ and the end of the tank. This float valve is for the purpose of controlling the level of the liquid refrigerant in the coil. $B^7$ $B^8$ are the pipes through which cooling water comes to and leaves the condenser for the purpose of cooling the condenser.

C is a water pipe discharging into the tank at the top. Water comes through that pipe from any suitable heat interchange device. The upper edge $C^1$ of the baffle $A^3$ serves as an overflow whereby the water level is kept as indicated so that all the coil is immersed in the tank. $C^2$ is a suction pipe having its intake at the lower portion of the chamber $B^6$. $C^3$ is a water pump associated with the top of the suction pipe $C^2$ and adapted to draw water therefrom and discharge it from the pipe $C^5$ to the heat exchange device. $C^6$ is the motor to operate the pump, the pump and motor being both supported on the cover B.

D is an electric control switch to control the flow of electric current through the conductors $D^1$ from any suitable source of electric power to stop and start the condenser unit. This switch operates responsive to variation in temperature of the water in the tank being controlled by means of the bulb $D^2$. $D^3$ is a coil immersed in the chamber $B^6$. Water is supplied thereto through the pipe $D^4$ controlled by a valve $D^5$ and cool water passes out through the pipe $D^6$ to be associated with the heat exchange device when that takes the form, as it preferably does, of an air conditioning cabinet containing a cooling coil and a spray nozzle, the water for the spray nozzle being cooled before it is fed from the pipe $D^6$ thereto.

In the modified form shown in Figures 4 to 7 inclusive, the principle of operation is identical but the details of arrangement are different. The tank in this case is cylindrical with its major axis vertical. The cylindrical tank E has a cover $E^1$ upon which are mounted the pumps and control mechanisms similar to that shown in Figure 1. The insulating character of the tank is illustrated in section and contained within the tank are a plurality, in this case preferably two, concentric sleeves $E^2$ $E^3$ supported from the bottom of the tank by means of legs $E^4$. Spiral expansion coils $E^5$ $E^6$ are brazed, welded or otherwise suitably fastened to the sleeves. The pipes $E^7$ and $E^8$ connect the coils which may be in series or parallel as the case may be, shown in this case in series, to the condenser unit, the refrigerant being supplied by the condenser unit to the coils just as illustrated in connection with Figure 1.

Water or other heat transfer liquid enters the tank at the top through the nozzles $F^1$ supplied by the pipe $F^2$, there being one nozzle inside the sleeve $E^2$, one nozzle between the sleeves $E^2$ and $E^3$ and a nozzle outside the sleeve $E^3$. These nozzles discharge the liquid tangentially so as to set up a whirling motion in the tank. The cooled water is withdrawn from the bottom of the tank through the pipe $F^3$ by means of the pump $F^4$ operated by the motor $F^5$, the cooled liquid being discharged to a suitable heat interchange device through the pipe $F^6$. The intake end of the pipe $F^3$ is below the lower limit of the two sleeves $E^2$ and $E^3$.

G is a float valve adapted to control the level of the refrigerant in the coils. $G^1$ is an automatic cut-off controlled by means of the thermometer bulb $G^2$ whereby when the water in the tank reaches a predetermined minimum, the electric circuit is broken and the condenser unit thrown out of operation. $G^3$ $G^4$ indicates the ice cakes, in this case two cylindrical ice sleeves formed about each coil and its associated sleeve. The thermometer bulb being spaced between the coils and sleeves $E^2$ $E^3$ is in the minimum water passage, the arrangement being such that before these ice sleeves have grown out to entirely close the passage, the condenser unit is shut off, leaving restricted passages through the tank inside the inner coil, between the inner and outer coil and outside the outer coil. $G^5$ is a spray or washer fluid cooling coil. It is immersed in the body of the tank and may receive water through the pipe $G^6$ controlled by the valve $G^7$ and discharge cooled water through any suitable spray or washer through the pipe $G^8$.

Preferably the refrigerant expansion coil is a coil but in any event the refrigerant expansion coil represents means in the liquid storage tank whereby liquid refrigerant may be expanded and heat withdrawn from the liquid in that tank, however that be done. The liquid in the storage tank and circulating through the heat exchange system is preferably water because it is cheap and very easily renewed and freezes at suitable temperatures but water is selected and described in our specification merely as indicative or exemplary of any liquid which remains such at ordinary room temperatures and which freezes at temperatures within the range satisfactory for the purpose indicated and wherein the latent heat of fusion is such as to permit storage of cooling effect by freezing and subsequent melting to accomplish the purpose desired.

It will be understood, of course, that because the water circulating pipe and the air cooling or heat exchange coil forms a closed circuit through the storage tank, that circuit will remain filled with water and the water in the circuit plus the water remaining unfrozen in the tank is the water which will circulate when the apparatus is started up after the major part of the water in the tank has been frozen.

Referring to the form of Figures 8 and 9, the structure is substantially the same as the structure shown in Figure 4 except for the features below discussed and like symbols are shown for like members. We provide, however, a spiral fin, vane or baffle structure generally indicated as H. It includes for example an initial outer member or portion $H^1$ extending into contact with the inner lining or face of the container E. This portion $H^1$ extends inwardly to a cylindrical portion $H^2$ which extends about an arc of almost 360 degrees, terminating in an inwardly extending member $H^3$. As will be clear from Figure 9 the members $H^1$ and $H^3$ are spaced apart a sufficient distance to permit the flow therethrough of water from the space exterior to the cylindrical portion $H^2$. $H^3$ in turn is at its inner edge connected to an inner cylindrical portion $H^4$ which terminates as at $H^5$ to leave a passage $H^6$. $H^7$ is a water inlet located adjacent the upper edge of the baffle structure H. Water flowing into the tank through the passage $H^7$ is constrained by the portion $H^1$, to flow to the left, referring to the parts in the position in which they are shown in Figure 9. The water then makes a substantially complete circuit of the tank and flows inwardly through the space between the members $H^1$ and $H^3$. It then makes another substantially complete circuit of the tank and flows inwardly through the aperture $H^6$. The water is drawn off from the bottom of the tank, as through the outlet $F^3$, pump $F^4$ and discharge passage $F^6$.

Referring to the form of Figures 10 to 13 we illustrate a helical vane structure generally indicated as J which may be formed with a plurality of plates $J^1$ riveted or otherwise secured together as at $J^2$. Each plate is penetrated by a plurality of apertures $J^3$ through which pass lengths or sections or branches $J^4$ of the cooling coil or member. In this form the bulb $G^2$ of the temperature responsive element is shown as positioned adjacent the top of the helical member J but it will be understood that while this is a convenient location, it may be located elsewhere, the important feature being that it is so located as to actuate the control for the compressor when the ice indicated at $J^{10}$ reaches the desired thickness. This thickness is preferably such as to permit the continued flow of water through the helix. $J^5$ indicates a single refrigerant line in communication with a plurality of the members $J^4$. Surrounding the duct $J^5$ and substantially closing the central space within the helix is a cylindrical jacket $J^6$ which serves to constrain the water to flow through the helix. Water for example may be supplied to the bottom of the tank as by the inlet $J^7$ and may be drawn from the top of the tank through an outlet $J^8$ in communication with the pump $F^4$ and discharge pipe $F^6$. In Figure 14 we illustrate the cooling coil $G^5$ for the spray water as located at the top of the tank, adjacent the water discharge at $J^8$. It will be understood of course that the location of the coil $G^5$, which is shown at the bottom of the tank in Figures 4 and 8 may be varied to suit the conditions of a particular installation. We do not wish to be limited to any specific location for it except so far as a particular location may specifically be claimed.

It will be realized that whereas we have described and shown a practical and operative device, nevertheless many changes might be made in size, shape, number and disposition of parts without departing from the spirit of our invention. We therefore wish our description and drawings to be taken as in a broad sense illustrative and diagrammatic rather than as limiting us to our specific showing.

We have used the word "coil" in the specification because for purposes of convenience and simplicity, we have illustrated the refrigerant traveling in a coil. Manifestly, in accordance with usual refrigeration practice, the refrigerant might be fed into, travel through or be expanded in any suitable receptacle other than a coil and we are using the term coil, therefore, as illustrative and in its broadest meaning, namely, as a receptacle which may contain the expanding refrigerant, be it made out of pipes or plates or anything else and whether the individual pipes or plates are actually coiled or spiraled or not.

We use the term "water" as descriptive of the heat exchanging fluid or medium which is circulated from the storage tank to and through the heat exchange device in the air conditioning unit. It might take the form of pure water or water mixed with alcohol or other material to reduce its melting point or mixed with glycerine to make it freeze as a slush rather than a hard cake and where I have used the term "water" it should be understood as applying gentrally to any suitable heat exchange liquid.

The use and operation of our invention are as follows:

In general, the operation of the devices shown in Figures 1 to 3 and in Figures 4 to 7 inclusive are the same. As long as the heat exchange fluid, preferably water, is caused to circulate through the heat exchange device in the air conditioning unit under operating conditions of normal heat transfer to the liquid, the liquid will not be cooled sufficiently to freeze on the refrigerant coil or its associated structure, but will flow with little obstruction through the tank and around the baffle plates in Figure 1 or from top to bottom longitudinally through the sleeves in Figure 4, or spirally and in a generally vertical direction as in Figure 10, being cooled by contact with the refrigerant coil and its associated structure.

When the circulation of the heat exchange fluid stops or when there is cessation of normal heat transfer in the heat exchange device in the air conditioning unit, as by stopping the air flow through such device, while the condensing unit continues to operate, the water in the tank will be cooled sufficiently to form ice, which formation will continue in Figure 1 until ice encloses the refrigerant expansion coil and the vanes or fins on the coil and most of the area of the baffle plates, leaving unfrozen water in the end of the tank beyond the last baffle plate where there is only nominal exposure to refrigerating surface. In all forms herein shown the ice formation is preferably stopped when at least edges of the vane are either still exposed or so thinly covered with ice that they will immediately be exposed when water begins to flow along its tortuous path. This is important since it is in the highest degree desirable that the expansion chamber be in heat conducting relationship with the flowing water at all times and that therefore the heat exchange element in the tank be not insulated from the water by the ice coating, ice being an exceedingly inefficient conductor of heat. Freezing action will stop when the water exposed to refrigerant coil and fins has completely frozen, by action of the thermostatic switch controlling the condenser unit motor operation, the thermostatic bulb being so placed as to function when the ice formation is complete. The tank will then be substantially filled with ice but with a flow channel therethrough above the ice, for subsequent melting.

Much the same thing happens in the device of Figure 4 except that as the ice builds up inside and outside of the two concentric sleeves, water spaces are left outside, between and within them and before these spaces fill up with ice, the thermostat will open the circuit and cause the condenser unit to stop operation, leaving the tank in this case almost filled with ice, the two concentric ice sleeves being immersed in a body of water.

In either instance, this results in materially decreasing the open cross sectional area of the tank. When water or heat exchange fluid which has picked up heat in the air cooling heat exchange device is again circulated through the tank it circulates at relatively high velocity through the tank owing to material reduction in open flow cross sectional area caused by the presence of the ice. This rapid movement of the water current causes a rapid transfer of its heat to the baffle plates and/or to the ice cake causing melting of the ice cake and causing a reduction of the temperature of the free water. As soon as the flow of the free water melts the ice immediately surrounding the thermostatic bulb, the bulb will take the temperature of the free water and operate the switch, causing the condenser unit to resume operation. Thereafter the circulating heat exchange water will be cooled both as a result of supplying latent heat of fusion to the ice cake and as a result of the cooling effect of the refrigerant now circulating through the coils. As the ice is gradually melted, a larger and larger proportion of the cooling effect results from the exposure of the refrigerant coils to water flow until all the ice has been melted, when the only cooling effect available is the cooling effect of the refrigerant expansion coil.

The result of this is that if we assume that the normal circulation and elevation of temperature of the heat exchange liquid requires a refrigerating capacity of 12,000 British thermal units per hour and we have put into the system a condensing unit having a capacity of 6,000 B. t. u. per hour, and we start operation in the morning, with a full ice charge in the tank, the condensing unit will furnish half of the refrigerating effect and the melting of the ice cake will furnish the other half; until at the end of the day's run, the ice will have been all melted and the condensing unit alone will absorb heat; at which time circulation of heat exchange water will stop and the condensing unit will go on operating to freeze the heat exchange water during the night, forming the cake of ice which on the following day is to absorb its latent heat of fusion to assist the condenser unit in carrying the 12,000 B. t. u. load, thus permitting a relatively small condensing unit continuously operated to give a greatly increased output over part of the twenty-four hours.

Referring to the form of Figures 8 and 9 the water or other liquid being cooled is constrained to a more or less spiral path through the tank by the concentric cylindrical vanes or baffles and it is upon these vanes that the ice will form. In the form of Figure 10 and following, on the other hand, a spiral or helical vane or baffle structure is employed. In each form the flowing liquid, preferably water, is constrained to a more or less spiral or helical path confined or defined by the adjacent opposed or overlying surfaces of the vanes. The control means prevent building up of ice sufficiently thick to cut off its path of flow, as when the ice reaches the bulb $G^2$ the control mechanism is actuated to cut off the condenser unit. Thus when operation begins in the morning there exists a path for the initial circulation of the liquid over the surface of the ice and as the liquid flows over the surface of the ice, along this rather tortuous path, it gradually melts the ice down until, at the end of a predetermined period the ice may be entirely gone and the liquid may be receiving all of its cooling effect from the refrigerant expansion member.

An important characteristic of the operation of our device rests in the fact that when the air conditioning device begins to work, for example, in Figure 1, at a time when the ice may have formed on the baffles $A^1$ and $A^2$ and the vanes $A^6$ to a level adjacent the top of the weir $C^1$, the stream of water flows across the face of the metal vanes as well as across the face of the ice, there being no time at which all the surfaces of the vanes and baffles are completely covered with ice. Assume that the top dotted line in Figure 1 indicates the top of the ice level, the old partitions or baffles $A^1$ $A^2$ project above the ice level and are exposed to the flow of the water. As the water melts off the top surface of the ice the heat conductive vanes $A^6$ are exposed through an increasing area and this increase of the exposed areas continues until the ice may be entirely melted away and all the vane and coil surface is exposed to the flowing water. When the water first begins its flow the cross-sectional area of the passage is at a minimum and the speed of flow of the water is at a maximum. As the ice on the vanes melts, the area of vanes exposed increases, increasing the heat transfer between the refrigerant and the water, and at the same time the velocity of the water decreases because of the increase in cross-sectional area of the passage through which it flows. It is hardly necessary to state that the transfer of heat increases almost directly in proportion to the increase in speed of flow of the liquid. Although the speed of flow of the liquid decreases as the ice melts, at the same time the exposed area of the heat conductive vanes increases, still maintaining the heat exchange at the desired level. Even when the ice is entirely melted away, the employment of the passage structure shown permits the maintenance of relatively high velocity of flow of freezible liquid through the tank, in glaring contrast to the rate of flow which would be possible in a tank of the same cubic content if the interior of the tank is not broken up into an elongated passage. In the forms of the other figures there is a similar exposure of vane surface, with the same result.

A further and vital advantage of the employment of an elongated or tortuous passage rests in the fact that it includes in the present structure the exposure of the liquid to a cold surface throughout an area vastly greater than would be possible if merely the usual spiral coil is dropped into a tank. For example, the coil structure of Figure 1 has associated with it the heat conducting baffles or vanes $A^1$ $A^2$ and the intermediate smaller conducting vanes $A^6$. These vanes, being of metal, are highly conductive of heat, and cause the actual heat exchange to take place over an area vastly greater than the area of the exterior of the coil structure itself. This exposed area of vane surfaces extends with substantial uniformity of distribution along the length of the tortuous path defined by the baffles $A^1$ $A^2$. Thus the heat exchange efficiency of the device is not merely increased by the speed of flow of the water in relation to a static body of water with mere convection currents, but also by the enormous increase of cold surface to which the water is exposed in its rapid movement through its own path. The vanes $J^1$ of Figure 10 have a similar function, and the members $H^2$ $H^4$ of Figure 8.

It will be understood that in practice we prefer to stop the formation of ice on the vanes before the vane surface is completely covered with ice or at least at a time when part of the vane surface is so thinly covered with ice that the insulating effect of the ice is insufficient to prevent substantially direct and unimpeded heat exchange between the flowing water and the vane surface. The ice tends to build up most thickly on the tubes and on the adjacent portions of the vanes. In general the thickness of ice on the vanes reduces in fairly direct relation to the distance to the nearest intersecting or connecting tube portion of the coil. We may employ any suitable means such as the member $G^2$ of Figures 8 and 10 or the member $D^2$ of Figure 1, to terminate the ice formation when the ice has reached a predetermined thickness, before the channel for the liquid is closed, and before the vane surface along the channel is completely covered.

It should be kept in mind that in our mechanism and method the heat transfer between the water and the cooling device takes place in three ways. In the first place there is the heat exchange taking place when the water melts off the exposed surface of the ice. In the second place there is the heat exchange between the water and the exposed vane surfaces. Thirdly, there is a heat exchange, through the ice, between the expansion member or coil and the water. This is more or less slow, depending on the thickness of the ice, but as the condenser is normally in operation during the flow of the water it does tend to build up ice and at least to delay the melting off of the ice body and to exchange some heat through the ice.

We claim:

1. In a liquid cooling system, a tank, means for circulating a liquid through said tank, a refrigerating unit including a refrigerant expansion member in said tank immersed in said liquid, said expansion member including a series of heat conductive wall members upon which a substantial thickness of ice may be frozen, said wall members being spaced to define a predetermined path for the liquid to flow therethrough in intimate contact with said ice, and means for stopping the operation of said refrigerator unit after said liquid has frozen to substantial thickness upon portions of said wall members but before the outer surfaces of said wall members are coated with ice of sufficient thickness to seriously impair rapid heat transfer from the unfrozen liquid to the wall members.

2. A system including a passage and means for passing a freezable liquid therethrough, a refrigerating system including a tank, means for circulating the freezable liquid therethrough, a refrigerating unit including an expansion means positioned within the tank, said expansion means being immersed in the freezable liquid within the tank, means within the tank for defining a predetermined path for the liquid circulating therethrough over said expansion means, and means for stopping the operation of said refrigerating unit, after a substantial amount of ice has formed on said expansion means but before said ice has entirely closed said path against the flow of liquid therethrough.

3. In a cooling system including a passage and means for passing a freezable liquid therethrough, a tank, means for circulating the freezable liquid therethrough, a refrigerating unit including an expansion member positioned within the tank, said member being immersed in the freezable liquid within the tank, heat conducting wall members arranged in direct heat conducting relationship with said expansion member and positioned to define a predetermined path for the liquid through the tank, said refrigerating unit operating to provide said expansion member and heat conducting wall members with a coating of frozen liquid, whereby the liquid is constrained to flow through the tank along an ice-lined path, and means for regulating the amount of ice accumulating on said wall members.

4. For use with a cooling system, a tank, means for circulating a freezable liquid therethrough, a refrigerant condenser unit and an expansion element therefor, the expansion element being immersed in the freezable liquid, means for guiding the circulation of said liquid along a predetermined path in close proximity to said expansion element, the refrigerant condenser unit being adapted, when the liquid is not being circulated, to freeze a part of said liquid along the path, and means for stopping the operation of the refrigerator condenser unit before such freezing entirely closes the path against a flow of the unfrozen liquid.

5. In a liquid cooling device, means for circulating a freezable liquid, a refrigerant condenser unit, an expansion element immersed in the freezable liquid, and means for constraining the liquid to circulation along a predetermined path in close proximity to the expansion element, including wall members of heat conductive material in heat conducting relationship with the expansion member, the expansion member being adapted to form ice on said walls along the path defined thereby, and means for stopping the operation of the refrigerant condenser unit after the liquid has frozen to a substantial thickness upon said walls, but before the passage defined by the walls is closed to further ready circulation of unfrozen liquid.

6. In a liquid cooling device, a tank, means for circulating a freezable liquid through such tank, a refrigerant condenser unit, an expansion element therefor immersed in the freezable liquid, passage means in said tank for constraining the freezable liquid to a predetermined path through such tank, said passage means including vanes of heat conductive material associated in ready heat transferring relationship with the expansion element, and means for stopping the operation of the refrigerant condenser unit before the outer surfaces of said vanes are entirely covered with ice of sufficient thickness to substantially interfere with heat transfer from the liquid to said vanes.

7. The method of cooling a stream of freezable liquid for purposes of non-continuous refrigeration, which includes intermittently freezing a body of such liquid, directing a flow of such liquid in contact with the surface of said frozen body, and subjecting both the frozen body and the flowing liquid to the more nearly continuous action of an additional cooling medium, while guiding the flow of said liquid in contact with the frozen body in a predetermined path.

8. The method of cooling a stream of freezable liquid for purposes of non-continuous refrigeration, which includes intermittently freezing a body of such liquid, directing a flow of such liquid in contact with the surface of said frozen body, and subjecting both the frozen body and the flowing liquid to the more nearly continuous action of an additional cooling medium, and terminating the action of said additional cooling medium when the frozen body of the liquid reaches a predetermined size, and thereby maintaining an open path for said liquid across the surface of said frozen body.

Signed at Chicago, county of Cook, and State of Illinois, this 9th day of April, 1932.

WAYNE D. JORDAN.
PAUL D. VAN VLIET.